United States Patent [19]

Vogt

[11] Patent Number: 5,398,364
[45] Date of Patent: Mar. 21, 1995

[54] WINDSCREEN CLEANING APPARATUS

[75] Inventor: Peter Vogt, Vienna, Austria

[73] Assignee: Veropa Dkfm.Peter Vogt KG, Erzeugung von Kunstsoffartikel, Vienna, Austria

[21] Appl. No.: 62,055

[22] Filed: May 14, 1993

[30] Foreign Application Priority Data

May 22, 1992 [AT] Austria .................. 1062/92

[51] Int. Cl.⁶ .......................................... A47L 13/022
[52] U.S. Cl. .................................. 15/105; 15/121; 15/236.02
[58] Field of Search ........... 15/236.01, 236.02, 236.05, 15/105, 245, 118, 121

[56] References Cited

U.S. PATENT DOCUMENTS

| 3,051,975 | 9/1962 | Schwartz | 15/236.02 X |
| 4,067,107 | 1/1978 | Scafetta . | |
| 4,124,915 | 11/1978 | Schlicher | 15/105 |
| 4,141,111 | 2/1979 | Hopkins et al. | 15/236.02 |
| 4,747,175 | 5/1988 | Durgin | 15/236.02 X |
| 5,263,222 | 11/1993 | Johnstone | 15/236.02 |

FOREIGN PATENT DOCUMENTS 0302142  8/1989  European Pat. Off. .

Primary Examiner—Chris K. Moore
Attorney, Agent, or Firm—Ladas & Parry

[57] ABSTRACT

A window cleaning apparatus for the removal of water, snow, ice and dirt from the windows of a motor vehicle is provided. The window cleaning apparatus comprises a larger cleaning member and a smaller cleaning member. Both the larger and the smaller cleaning members have a handle and a wiper lip. The smaller cleaning member fits on and is releasably connected to the handle of the larger cleaning member.

14 Claims, 1 Drawing Sheet

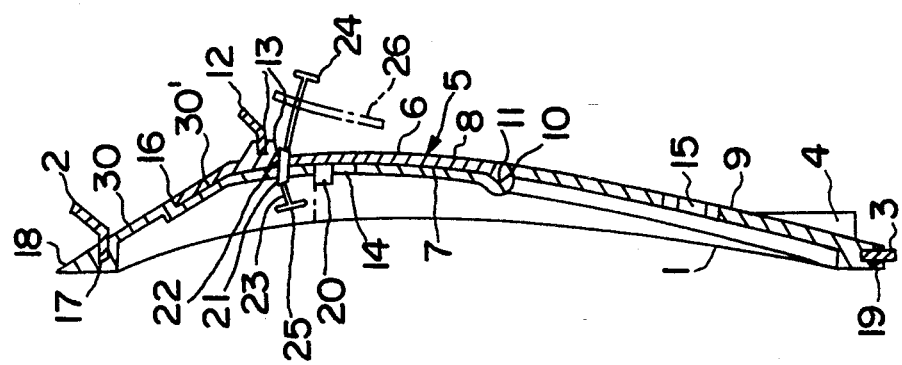
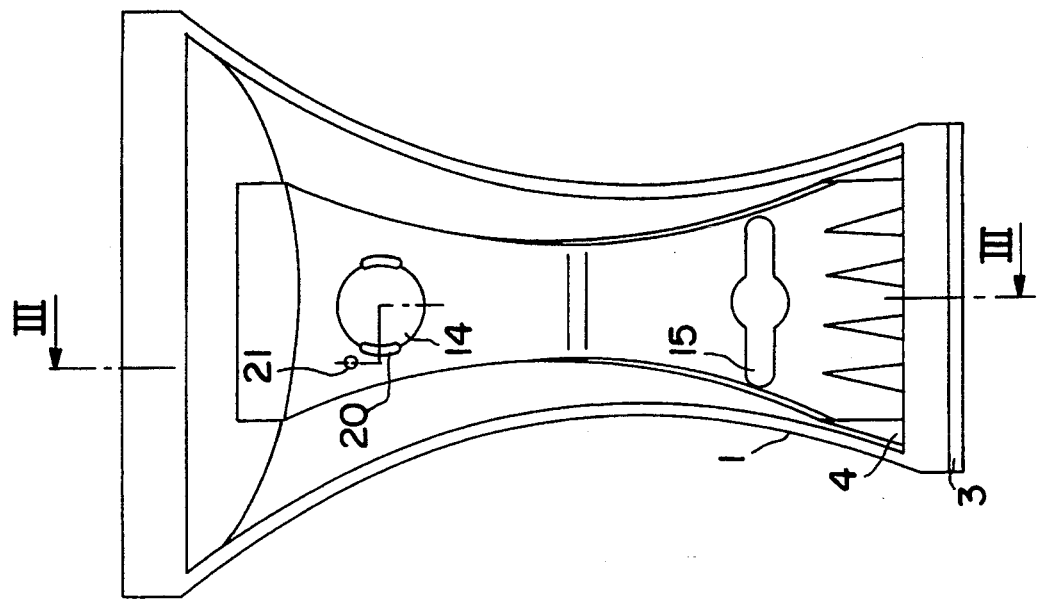
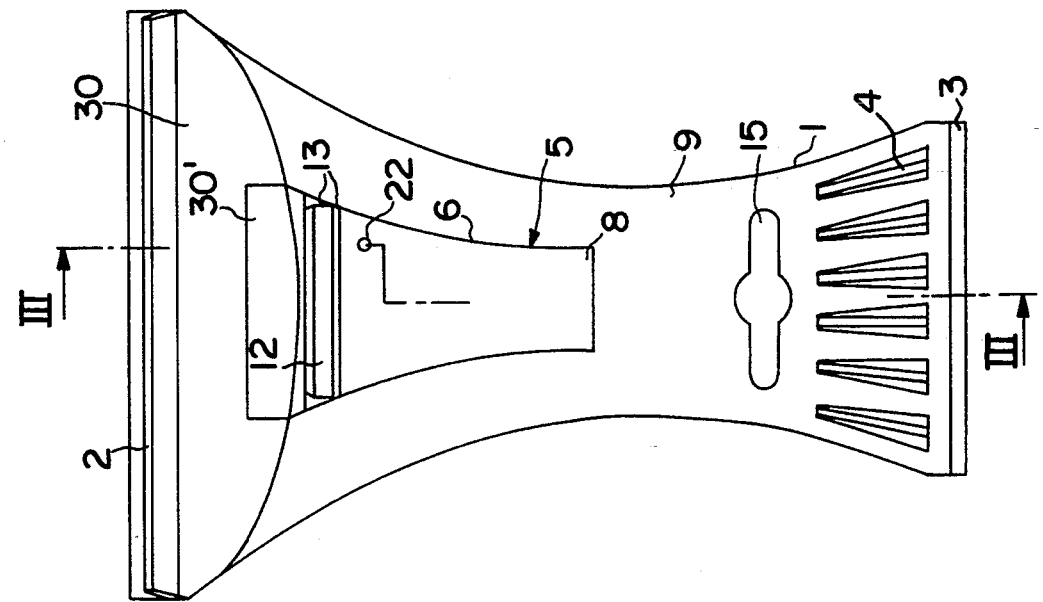

WINDSCREEN CLEANING APPARATUS

BACKGROUND OF THE INVENTION AND PRIOR ART

The invention relates to a window cleaning apparatus comprising a combination of two mutually releasably interconnected window wipers of different sizes, in particular for the removal of water, snow and ice from the windows of a motor vehicle. The cleaning apparatus includes a handle, a holder, a plate or the like and a wiper lip for the window panes.

U.S. Pat. Specification No. 4,067,107 discloses a cleaning apparatus composed of two devices of which the smaller portion is insertable into a pocket of the larger portion. In this cleaning apparatus, the smaller portion takes the form of a scoop and is provided with a handle which, when the smaller portion is inserted, projects from the larger portion. This apparatus cannot be used for the purpose of the present invention because it takes up too much space and cannot be accommodated in the glove compartment (cubbyhole) of a motor vehicle.

GENERAL DESCRIPTION OF THE INVENTION

In the present invention, both windowpane cleaning devices are designed as a handle, a holder, a plate or the like and the smaller windowpane cleaning device for cleaning a rear-view mirror is preferably provided with a wiper lip and is fitted onto or into the larger window cleaning device.

Preferably, the smaller cleaning device also comprises a wiper lip. Also preferably, both the smaller and larger cleaning devices comprise at least one aperture for passing therethrough a securing means as protection against theft or accidental coming apart at a trade outlet. The securing means may take the form of a thread. Thus, in a specific embodiment, the handle of the smaller cleaning device and a recess in the larger device for the insertion therein of the smaller cleaning device is provided. Both may include holes in alignment with one another through which passes a destructible theft protection means.

These features facilitate drawing through the two holes a plastic thread fitted at both ends with a transverse web, which may serve for the attachment thereto of advertising announcements, e.g. a label, and simultaneously prevents loss of the smaller device by shoplifting.

Preferably the smaller window cleaning device is designed in a configuration or shape which corresponds with the larger window cleaning device. More particularly, the smaller window cleaning device is releasably inserted in a recess in the surface of the larger window cleaning device, and the shape of the smaller window cleaning device is substantially the same or similar to the recess of the larger window cleaning device. In particular, the handle comprises a recess for the insertion by way of a projection of the handle, holder, plate or the like of the smaller cleaning device.

In accordance with a preferred embodiment, the handle, holder, plate or the like of the larger window cleaning device in the region of the smaller window cleaning device comprises a passage through which the small window device can be forced out with a finger, the smaller cleaning device comprising projections projecting into the passage with a snap fit.

Preferably, the smaller cleaning device in the region of the passage comprises catch means, preferably in the form of projections, which engage into the passage in a snap closure fashion.

Preferably, the smaller cleaning device comprises an ice scraping edge.

Advantageously, the upper surface of the smaller cleaning device, when inserted into the larger cleaning device, is flush with the surface of the larger cleaning device.

Further details of the invention will be explained with reference to the drawings, in which a working example of the window cleaning apparatus is illustrated.

BRIEF DESCRIPTION OF THE DRAWINGS

FIG. 1 is a front view;

FIG. 2 is a rear view of the window cleaning device; and

FIG. 3 is a section along the line III—III of FIG. 1.

DETAILED DESCRIPTION OF PREFERRED EMBODIMENTS

The window cleaning apparatus, according to the invention, comprises an elongate, slightly upwardly bent handle or grip 1, having inwardly arcuate side walls for convenient holding. The grip 1 has ends of different widths, there being provided close to the wider end a wiper lip 2 of rubber, plastics or the like, projecting from the surface of the handle 1 and inserted into a groove 17 extending transversely to the handle 1. This lip 2 serves to wipe water off the windows of a motor vehicle. The wider end of the handle 1 which follow the lip 2 may at least in part be sharpened to permit removal of dirt particles adhering to the window. At the opposite, narrower end of the handle 1, a wiper 3 made of metal is inserted into a groove 19 and can be used for the removal of ice incrustations. If thick ice layers are present, the window cleaning apparatus has embossed on the surface of the handle 1 in the region of the wiper 3 a series of cutting ribs 4 extending off the handle 1. The ribs at least partially facilitate breaking and removal of these ice layers.

For cleaning the rear-view mirror, a smaller cleaning device 5 is provided. The smaller cleaning device 5 has a handle 6 located over the handle 1 and is insertable into a recess 7 on the upper, wider portion of the handle 1. The handle 6 terminates at its upper surface 8 which is flush with the upper surface 9 of the handle 1. The handle 6 is provided with a wiper lip 12, which is held between guide means of the handle 6 and, in a manner similar to that of the wiper lip 2, projects outwardly from the embossed surface of the handle 6 and extends parallel to the wiper lip 2. The wider end of the handle 6 is sharpened and serves as an ice scraper edge 16. It stands to reason that it is possible also to design the cleaning device 5 in a different manner and, for example, to provide it with ribs similar to the cutting ribs 4.

The wider end of the handles 1 and 6 is provided with a chamfering 30, 30' such that the two chamferings 30, 30' with the smaller wiper 6 inserted into the larger one become located in a single plane.

In order to press the cleaning device 5 from the handle 1, the bottom surface of the recess 7 of the handle 1, in the region of the cleaning device 5, is provided with a passage 14 which is preferably round and which permits the finger to force out the cleaning device 5. In order to provide the cleaning device 5 in the handle 1 with a retentive bias, i.e. keep the cleaning device 5 releasably attached to the handle 1, the handle 6 is provided with projections 20, preferably arranged in a ring-like configuration, which engage the periphery of the passage 14 and have a snap closure action therewith. This is achieved by having the projections 20 define a diameter just slightly larger than the passage 14, best seen in FIG. 2. In attaching or detaching the handle 6, the projections 20 are minimally deformed towards the center of the passage 14, and snap back into their original position once through the passage 14. The configuration of the passage 14 as well as the projections 20 can obviously be selected according to need.

In order to suspend the cleaning device in the self-service section of stores, the handle 1 is provided with an appropriate aperture or slot 15. In order to prevent theft of the small cleaning device, the handle 6 thereof as well as the recess 7, are provided with mutually aligned holes 21, 22 through which, as shown in FIG. 3, a plastic thread or strip 23 with cross webs 24 at one end for carrying an advertising label 26 can be drawn. The cross webs 24, 25, which must be of greater length than the diameter of the holes 21, 22, prevent the handle 6 from being removed from the handle 1. The removal of the handle 6 from the handle 1 is rendered possible only by cutting the thread 23.

In stands to reason that, within the scope of the invention, various constructional modifications can be carried out. Thus, for example, the handles 1 and 6 may be designed in different shapes, e.g. as plates, holders or the like. Further, there is also the possibility of connecting the smaller cleaning device for the rear-view mirror to the cleaning device intended for the windows in a manner different from that described. This may be in the form of an attachment, plug-on or plug-in component which, however, must not project beyond the side rims of the larger cleaning device.

What we claim is:

1. A window cleaning apparatus for the removal of water, snow, ice and dirt, the apparatus comprising:
   a large cleaning member having a handle and a wiper lip;
   a smaller cleaning member having a handle and a wiper lip; wherein the smaller cleaning member is releasably connected to the handle of the larger cleaning member; and
   an aperture in each of the handle of the larger cleaner member and the handle of the smaller cleaning member, the apertures receiving a securing means for keeping the larger cleaning member and smaller cleaning member in close proximity to each other when the small cleaning member is released from the larger cleaning member.

2. Apparatus as claimed in claim 1 wherein the securing means comprises a thread.

3. Apparatus as claimed in claim 1 wherein the aperture in each of the larger and smaller cleaning members respectively are aligned with each other when the smaller cleaning member is connected to the handle of the larger cleaning member.

4. Apparatus as claimed in claim 1 wherein the smaller cleaning member has a shape and configuration which corresponds to the shape of at least a portion of the larger cleaning member.

5. Apparatus as claimed in claim 1 wherein the larger cleaning member has a recess in a surface thereof for receiving the smaller cleaning member.

6. Apparatus as claimed in claim 5 wherein the shape and configuration of the recess is such that it corresponds with and snugly receives the smaller cleaning member.

7. Apparatus as claimed in claim 5 wherein the recess of the handle on the larger cleaning member comprises a groove therein, and the handle of the smaller cleaning member comprises a projection which is received in the groove.

8. Apparatus as claimed in claim 5 wherein the handle of the larger cleaning member further comprises a passage therein, and the smaller cleaning member comprises a plurality of projections thereon such that, when the smaller cleaning member is connected to the larger cleaning member, the projections engage in the passage to provide a snap fit action, whereby the projections can be forced out of the passage by finger action.

9. Apparatus as claimed in claim 8 wherein the smaller cleaning member further comprises catch means adapted to engage in the passage in a snap fit action.

10. Apparatus as claimed in claim 5 wherein the smaller cleaning member has an upper surface which, when inserted into the recess of the larger cleaning member, is flush with a surface of the larger cleaning member.

11. Apparatus as claimed in claim 1 wherein the smaller cleaning member includes an ice scraping edge.

12. Apparatus as claimed in claim 1 wherein the handle of the smaller cleaning member and the handle of the larger cleaning member each include holes for receiving theft protection means.

13. Apparatus as claimed in claim 12 wherein the theft protection means comprises a plastic thread, said plastic thread also being adapted to receive a label.

14. A window cleaning apparatus for the removal of water, snow, ice and dirt, the apparatus comprising:
   a larger cleaning member having a handle and a wiper lip;
   a smaller cleaning member having a handle and a wiper lip; wherein the smaller cleaning member is releasably connected to the handle of the larger cleaning member; and
   a hole in each of the handle of the smaller cleaning member and the handle of the larger cleaning member, the holes each receiving theft protection means.

* * * * *